US010848995B2

(12) United States Patent
Dhanapal et al.

(10) Patent No.: US 10,848,995 B2
(45) Date of Patent: Nov. 24, 2020

(54) REDUCING POWER USAGE DURING ACTIVITY

(71) Applicant: APPLE INC., Cupertino, CA (US)

(72) Inventors: Muthukumaran Dhanapal, Sunnyvale, CA (US); Sethuraman Gurumoorthy, San Jose, CA (US)

(73) Assignee: Apple Inc., Cupertino, CA (US)

(*) Notice: Subject to any disclaimer, the term of this patent is extended or adjusted under 35 U.S.C. 154(b) by 100 days.

(21) Appl. No.: 15/940,146

(22) Filed: Mar. 29, 2018

(65) Prior Publication Data

US 2019/0306732 A1 Oct. 3, 2019

(51) Int. Cl.

| | | |
|---|---|---|
| *H04W 16/32* | (2009.01) | |
| *H04W 72/10* | (2009.01) | |
| *H04W 4/80* | (2018.01) | |
| *H04W 88/06* | (2009.01) | |
| *H04W 84/12* | (2009.01) | |
| *H04W 24/08* | (2009.01) | |
| *H04W 76/10* | (2018.01) | |
| *H04L 12/26* | (2006.01) | |
| *H04W 52/02* | (2009.01) | |

(52) U.S. Cl.
CPC .......... *H04W 24/08* (2013.01); *H04L 43/16* (2013.01); *H04W 16/32* (2013.01); *H04W 52/0235* (2013.01); *H04W 72/10* (2013.01); *H04W 76/10* (2018.02); *H04W 4/80* (2018.02); *H04W 84/12* (2013.01); *H04W 88/06* (2013.01)

(58) Field of Classification Search
CPC ..... H04W 48/16; H04W 88/04; H04W 72/04; H04W 36/24
See application file for complete search history.

(56) References Cited

U.S. PATENT DOCUMENTS

2012/0214501 A1\* 8/2012 Johansson ............ H04W 48/20
 455/452.1
2013/0258883 A1\* 10/2013 Vargas Bautista ..........................
 H04W 36/0094
 370/252
2013/0288694 A1\* 10/2013 Mochizuki ............ H04W 72/04
 455/450

\* cited by examiner

*Primary Examiner* — Iqbal Zaidi
(74) *Attorney, Agent, or Firm* — Fay Kaplun & Marcin, LLP (57) ABSTRACT

A device, system, and method reduce a power usage while an activity state is detected. The method is performed at a device that establish a network connection to a first network via first cells and to a second network via second cells. The device is connected to the first network via a first cell of the first cells. The method includes determining an activity state or a non-activity state associated with the device. The method includes measuring a quality of the network connection via the first cell. When the activity state is determined and when the quality is at least a predetermined threshold, the method includes setting a first priority and a first scanning pace for the first cell and a second priority and a second scanning pace for other ones of the first cells and the second cells.

17 Claims, 5 Drawing Sheets

Fig. 5 a processor determining an activity state or a non-activity state associated with the device. The processor measures a quality of the network connection via the first cell. When the activity state is determined and when the quality is at least a predetermined threshold, the processor sets a first priority and a first scanning pace for the first cell and a second priority and a second scanning pace for other ones of the first cells and the second cells. The first and second priorities indicate a preference for selection. The first and second scanning paces indicate a frequency with which a measurement is performed for the corresponding cells.

REDUCING POWER USAGE DURING ACTIVITY

BACKGROUND INFORMATION

A user equipment (UE) may be configured to establish a connection to at least one of a plurality of different networks or types of networks as well as with other UEs to perform a variety of different functionalities via the connection. For example, the UE may connect to a first type of network (e.g., Long Term Evolution (LTE) network) to communicate with another UE through the network connection (e.g., a user of the UE may perform a voice call or transmit a text to another user of another UE). In another example, the UE may connect to a second type of network (e.g., WiFi network) to receive browser data at a higher rate of data exchange. In a further example, the UE may directly connect to a further UE using a short-range communication protocol (e.g., BlueTooth).

When the UE is mobile, the UE may be utilized in various different locations while the user of the UE is performing any of a variety of different activities. For example, the user of the UE may be performing a workout, an exercise, a physical action, etc. (hereinafter collectively referred to as an "activity") while the UE is kept on the person of the user or is worn by the user. The UE may be configured to enable the user to track a progress of performing the activity. For example, the UE may track a distance traveled, a time spent, body measurements, etc. However, during the activity, the UE may be exposed to conditions where a network coverage may become poor. For example, the user may be located in a remote area where cellular coverage may be relatively weak compared to a city center. In another example, the user may place the UE in a different medium (e.g., submerged in water during a swimming activity). The UE may perform a variety of operations to compensate for the poor network coverage that leads to a higher than usual battery drain, leading to a poor user experience.

SUMMARY

The exemplary embodiments are directed to a method that reduces power usage while an activity state is detected. The method is performed at a device that is configured to establish a network connection to a first network via one of a plurality of first cells and to a second network via one of a plurality of second cells. The device is connected to the first network via a first cell of the plurality of first cells. The method includes determining an activity state or a non-activity state associated with the device. The method includes measuring a quality of the network connection via the first cell. When the activity state is determined and when the quality is at least a predetermined threshold, the method includes setting a first priority and a first scanning pace for the first cell and a second priority and a second scanning pace for other ones of the first cells and the second cells. The first and second priorities indicate a preference for selection. The first and second scanning paces indicate a frequency with which a measurement is performed for the corresponding cells.

The exemplary embodiments are directed to a device that reduces power usage while an activity state is detected. The device includes a transceiver configured to establish a network connection to a first network via one of a plurality of first cells and to a second network via one of a plurality of second cells. The device is connected to the first network via a first cell of the plurality of first cells. The device includes The exemplary embodiments are directed to a method that reduces a power usage while an activity state is detected. The method is performed at a device that is configured to establish a network connection to a first network via one of a plurality of first cells and to a second network via one of a plurality of second cells. The device is connected to the first network via a first cell of the plurality of first cells. The method includes determining an activity state or a non-activity state associated with the device. The method includes measuring a quality of the network connection via the first cell. When the activity state is determined and when the quality is below the predetermined threshold, the method includes setting a first priority and a first scanning pace for the first cells and a second priority and a second scanning pace for the second cells. The first and second priorities indicate a preference for selection. The first and second scanning paces indicate a frequency with which a measurement is performed for the corresponding cells.

DETAILED DESCRIPTION

The exemplary embodiments may be further understood with reference to the following description and the related appended drawings, wherein like elements are provided with the same reference numerals. The exemplary embodiments are related to a device, system, and method for determining when an activity is being performed by a user who has a user equipment (UE) and subsequently dynamically determining operations to be performed on the UE when the activity is detected. While the user is performing the activity, the UE may be exposed to an environment where one or more factors cause a network coverage to become poor which leads to poor network service. Accordingly, the exemplary embodiments provide a mechanism to determine operations to be performed when the activity is detected on the UE. In a first aspect, the exemplary embodiments determine a priority of radio access technologies, cells, or both to establish or maintain a network connection during the activity. In a second aspect, the exemplary embodiments determine an approach when an out of service event results from the prioritization of the first aspect. In a third aspect, the exemplary embodiments determine whether data transfer sessions are enabled or disabled during the activity.

Initially, it is noted that the exemplary embodiments are described with regard to a UE. However, the UE is only exemplary. The exemplary embodiments may be utilized with any device that may establish one or more connections as well as one or more types of connections (e.g., to a network, to a device, etc.) as well as be configured with the hardware, software, and/or firmware to establish one or more connections. Therefore, the UE as described herein is used to represent any device capable of establishing these connections.

It is also noted that the exemplary embodiments are described to include scenarios in which the UE is an accessory UE. In such a scenario, the accessory UE and a companion source UE may establish a short-range communication pathway (e.g., where the accessory UE is a slave and the source UE is a master). Accordingly, when the accessory UE and the source UE are connected over the short-range communication pathway, in one manner, the accessory UE may receive data via the source UE while deactivating any network capabilities to a cellular network and/or a WiFi network. In another manner, the accessory UE may maintain network capabilities even when the accessory UE and the source UE are connected over the short-range communication pathway. When the accessory UE and the source UE are not connected, the accessory UE may exchange data over any network to which it is configured to connect (instead of through the source UE). However, the use of the accessory UE and the source UE is only exemplary. The exemplary embodiments may be utilized for any UE (with or without a companion UE) and represent any device. Furthermore, for illustrative purposes, the exemplary embodiments are described with regard to the UE attempting to establish a connection with a Long Term Evolution (LTE) network or a Wideband Code Division Multiple Access (WCDMA) network. More generally, the LTE network may be an example of an Evolved Universal Mobile Telecommunications System (UMTS) Terrestrial Radio Access Network (EUTRAN) while the WCDMA network may be an example of a UMTS Terrestrial Radio Access Network (UTRAN). However, those skilled in the art will understand that the exemplary embodiments may also be used for or in combination with connecting to a further UE and any type of network.

A UE may be wearable and provide various functionalities and features. For example, the UE may be worn during a workout activity to track a user's health or monitor performance during the workout activity. In another example, the UE may be worn throughout the day to track various health parameters (e.g., calorie burn, steps, etc.). The mobility of the UE may place the UE in various environments where a network coverage may be strong, poor, and any intermediary quality. For example, while hiking, running, cycling, etc., the UE may move toward a periphery of a network operating area (e.g., a remote location) where the network coverage becomes poor. In another example, while performing an activity indoors (e.g., a gym, a pool, etc.), the location may be substantially shielded where signals from the network may not or may have difficulty in reaching the UE inside the location. In a further example, when the UE is configured to be water resistant, a user may perform an activity that causes the UE to be submerged where the network coverage becomes poor due to a change in a medium through which signals are to propagate. In yet another example, the activity may entail increased movement that may cause the UE to rapidly move between coverage areas of different cells. Accordingly, the activity may place the UE in a scenario or area where network coverage is poor that leads to an increased usage of power (e.g., at a baseband side) from a limited power supply of the UE.

A conventional mechanism used in establishing a connection, particularly a network connection to a LTE network, is a network lock. Thus, when the UE is camped to the LTE network when an activity is started, the conventional mechanism locks the radio access technology (RAT) to the LTE network. A substantially similar process of locking the RAT may be used for other network types such as a WCDMA network. However, the conventional mechanism blindly locks the RAT without considering a status of the UE such as when the UE is with a user performing an activity that may place the UE in a poor network coverage location. In fact, the network lock may prioritize cells or RATs that are less effective to the UE when a user is performing an activity at a location having poor network coverage. This prioritization may increase a frequency with which the prioritized cells or RATS are queried to establish a network connection. However, with the prioritized cells or RATs being less effective, the operations may have a negative result that drains the power of the UE.

In view of the poor network coverage that a UE may experience when a user of the UE is performing an activity, the exemplary embodiments provide a mechanism in which a determination of an activity modifies approaches for operations that are to be performed for various aspects. As will be described in further detail below, upon detecting an activity that places the UE in a poor network coverage, the exemplary embodiments dynamically prioritize cells and RATs based on a quality of a current connection. In this manner, the UE may establish or maintain a network connection with greater success. Despite efforts from the prioritization, when an out of service (OOS) event is detected, the exemplary embodiments provide an approach to perform scans to establish a network connection based on the conditions of the UE. Furthermore, upon detecting an activity that places the UE in a poor network coverage, the exemplary embodiments selectively enable data transfer sessions based on a purpose or source of corresponding requests.

Figure 1:
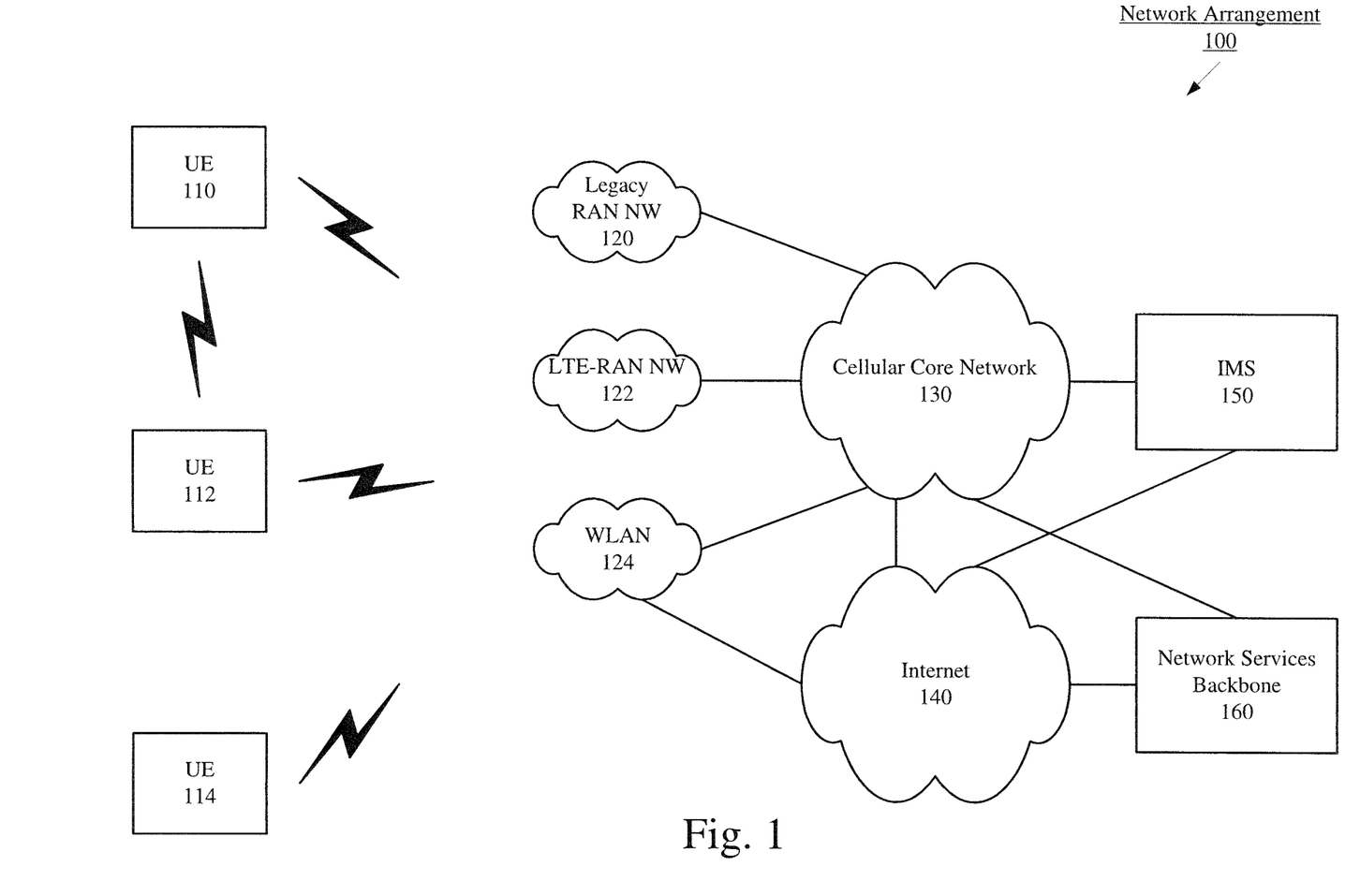
FIG. 1 shows an example network arrangement according to various exemplary embodiments described herein.

FIG. 1 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may wirelessly communicate are a legacy radio access network (RAN) 120 (e.g., a 3G network, a WCDMA network, a UMTS network, etc.), a LTE RAN (LTE-RAN) 122, and a wireless local area network (WLAN) 124 (e.g., a WiFi network). However, it should be understood that the UEs 110-114 may also communicate with other types of networks (e.g., 5G networks, etc.). With regards to the exemplary embodiments, in a particular implementation, the UEs 110-114 may establish a connection with one or more of the legacy RAN 120, the LTE-RAN 122, and the WLAN 124. For example, the UEs 110-114 may have a legacy chipset, a LTE chipset, and/or a WiFi chipset that are used to communicate with the legacy RAN 120, the LTE-RAN 122, and/or the WLAN 124, respectively. The use of three (3) networks is only exemplary and there may be any other number of networks with which the UEs 110-114 may communicate. In a particular implementation and as used herein for the exemplary embodiments, the UEs 110-114 may connect to the LTE-RAN 122 and a WCDMA network which is included in the legacy RAN 120. Thus, any reference to the legacy RAN 120 herein may represent the WCDMA network. However, it is again noted that the legacy RAN 120 may include other types of legacy networks and the exemplary embodiments may be utilized with these other types of legacy networks.

Each of the UEs 110-114 may also be configured to communicate with the other UEs 110-114 without using the networks 120-124. For example, as illustrated, the UE 110 may communicate with the UE 112 using a short-range communication protocol such as BlueTooth. Thus, if the UE 110 and the UE 112 are within a proximity of one another (e.g., within a distance in which BlueTooth communications may be performed), the UE 110 and the UE 112 may exchange data. In a specific exemplary embodiment, if the short-range communication protocol is being used, the UE 110 and the UE 112 may have a companion relationship where the UE 110 is an accessory device and the UE 112 is a source device. In a further implementation, the UE 110 as the accessory device may be a slave while the UE 112 as the source device may be a master. Thus, in one manner, the UE 110 may utilize only the short-range communication protocol without connecting to any of the networks 120-124 while the UE 112 may connect to one or more of the networks 120-124 and relay data exchanged between the networks 120-124 and the UE 112 to the UE 110 over the short-range communication pathway. In another manner, the UEs 110, 112 may be configured to connect to any of the networks 120-124 as well as to each other. However, it is again noted that the use of a companion relationship is only exemplary and the UE 110 may connect to one or more of the networks 120-124 whether or not the UE 110 is within range of communicating with the UE 112 over the short-range communication pathway. With regard to use of the short-range communication pathway, the exemplary embodiments may include features for both scenarios where the UE 110 may establish a connection to one of the networks 120-124 and to the UE 112 or where the UE 110 may only establish a connection to the UE 112.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, gNBs, etc.) that are configured to send and receive traffic from UEs that are equipped with the appropriate cellular chip set. The WLAN 124 may include any type of wireless local area network (e.g., WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

Figure 2:
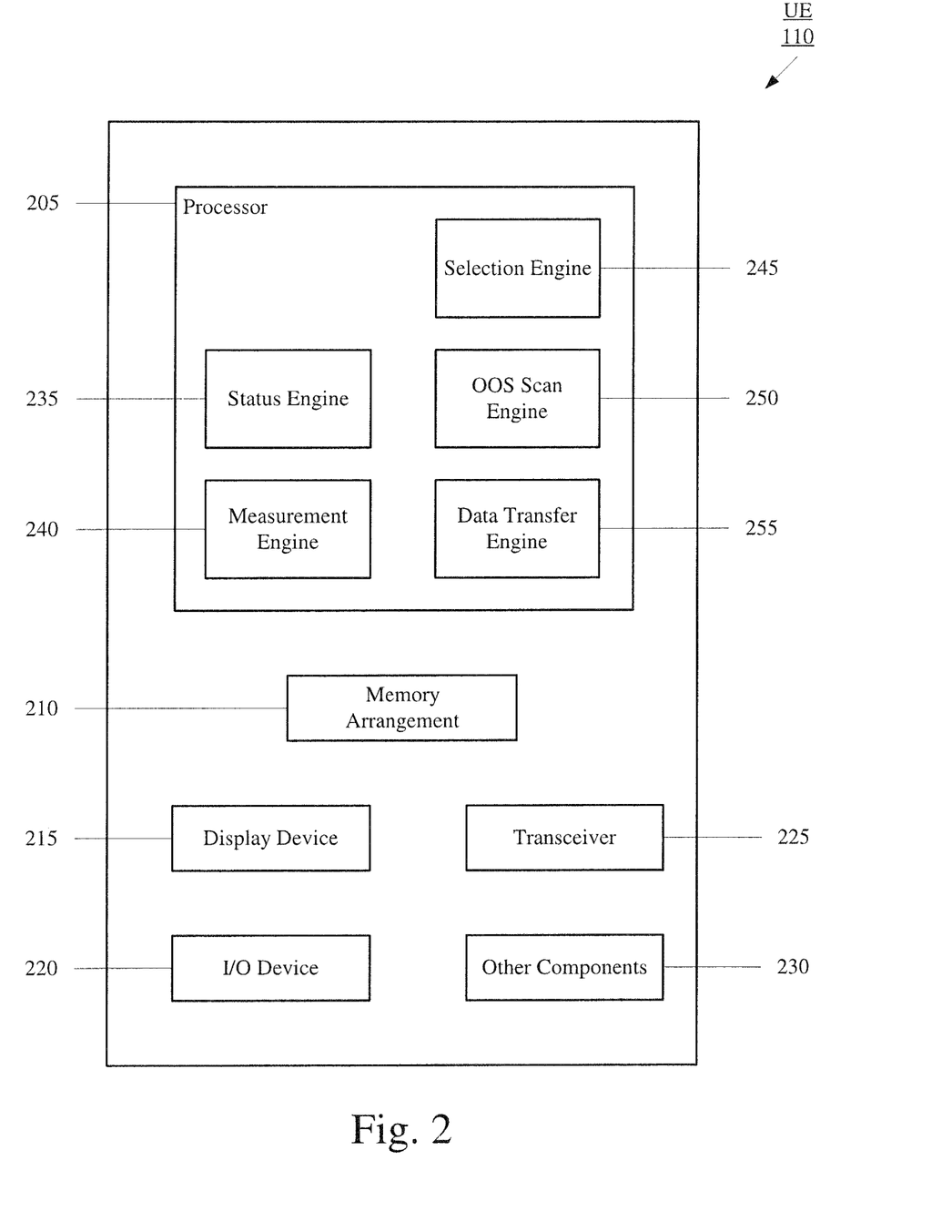
FIG. 2 shows an example user equipment according to various exemplary embodiments described herein.

The exemplary embodiments relate to the UE 110 determining when an activity is being performed by a user while the UE 110 is with the user (e.g., worn). When the user is performing the activity which places the UE 110 in a location with a poor network coverage, the exemplary embodiments subsequently dynamically perform operations based on current conditions of the UE 110. FIG. 2 shows the UE 110 of the network arrangement 100 of FIG. 1 according to the exemplary embodiments. The UE 110 is configured to execute a plurality of engines that perform functionalities to address scenarios when performing the activity results in poor network coverage as well as perform functionalities with sufficient network coverage. It is noted that the UE 110 being configured with the features of the exemplary embodiments is only exemplary. That is, the UE 110 may also represent the UEs 112, 114.

The UE 110 may represent any electronic device that is configured to perform wireless functionalities and may be representative of one or more of the UEs 110-114 (examples of which are noted above). The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the engines may include a status engine 235, a measurement engine 240, a selection engine 245, an OOS scan engine 250, and a data transfer engine 255. The status engine 235 may be configured to determine an activity status. The activity status may relate to whether the user of the UE 110 is performing or has concluded the activity. The measurement engine 240 may be configured to measure a quality of a current connection of the UE 110 to a network. The selection engine 245 may be configured to select a cell to which a connection is to be established based on the outputs of the status engine 235 and the measurement engine 240. The OOS scan engine 250 may be configured to perform operations when a panic mode is entered upon an OOS event occurring from using the functionality of the selection engine 245. The data transfer engine 255 may be configured to selectively enable or disable a data transfer session based on current conditions of the UE 110 and a type of data transfer session.

It should be noted that the above noted engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor, as will be described in further detail below. The exemplary embodiments may be implemented in any of these or other configurations of a UE.

The memory 210 may be a hardware component configured to store data related to operations performed by the UE 110. As will be described in further detail below, the memory 210 may store data associated with network measurements for a current connection as well as a priority and a pace for establishing a network connection. The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to establish a connection with at least one of a base station associated with the legacy RAN 120, a base station of the LTE-RAN 122 (e.g., an evolved Node B (eNB)), a router of a WLAN 124, the UE 112, etc. Accordingly, the transceiver 225 may operate on a variety of different frequencies or channels (e.g., set of consecutive frequencies). For illustrative purposes, as noted above, the exemplary embodiments are described with regard to the legacy RAN 120 and the LTE-RAN 122 to which the UE 110 may establish a connection. However, the exemplary embodiments may be configured to also connect to other networks. The exemplary embodiments are also described with regard to the UE 110 having an initial connection to the LTE-RAN 122. However, the exemplary embodiments may be used with an initial connection to any network including the legacy RAN 120.

As described above, the status engine 235 may determine an activity status indicating whether the user of the UE 110 is performing the activity or has concluded the activity. That is, the status engine 235 may detect when the UE 110 is in an environment where the network coverage of the LTE-RAN 122 may range from strong to poor. The status engine 235 may be capable of determining the activity status utilizing a plurality of different mechanisms. As will be described in further detail below, the UE 110 may include applications in which a user manually provides an input indicating the activity status. The UE 110 may also include further components (e.g., sensors, which may be considered other components 230) that are used by the status engine 235 to automatically determine the activity status.

The user may utilize an activity application installed on the UE 110 to manually identify the activity status. For example, the activity application may include a plurality of features that tracks a progress of an activity being performed. The progress may be for a current activity as well as a historical progress of one or more previous activities. The activity application may be capable of tracking a plurality of different parameters related to the user and/or the activity. For example, in addition to the activity condition, the activity application may track a distance traveled, a time the activity has been performed, a heart rate, a body temperature, etc.

It is noted that the user may utilize the activity application and enter an input to identify the activity. The user may also manually enter an input indicating a current moment of the activity. For example, the user may initiate, exit, pause, or resume use of the activity application for a selected activity. The UE 110 may also be configured to utilize data/metadata of the activity application to determine the current moment of the activity. The exemplary embodiments may focus on whether the activity is being performed. Thus, an instantaneous activity condition corresponding to a negative activity status (e.g., the activity is not being performed at this instant) may be omitted from consideration since the UE 110 may still be disposed in the attenuation environment. Accordingly, the status engine 235 may determine the activity status over a period of time instead of at individual moments. In this manner, the status engine 235 may determine when the activity is started or ended where a prolonged pause (e.g., beyond a predetermined threshold time duration) may constructively be considered an end and start as well. The status engine 235 may also utilize further available information to determine whether the activity status is to be updated. For example, location information may confirm whether the activity status is to be positively maintained or updated negatively. If the UE 110 determines that the activity has stopped (even temporarily), the status engine 235 may determine that the activity was only paused (e.g., less than the predetermined threshold time duration) and still positively detect the activity status if the location remains substantially unchanged (e.g., the location indicates the user is still in a pool area).

As noted above, the activity status may also be automatically identified using any of a variety of other manners based on available technologies in the UE 110 (e.g., when a manual input is not available). In a first example, the status engine 235 may perform an implicit detection of when an activity starts/ends based on metrics measured by a cellular baseband. For example, the metrics may include measurements in a predetermined time interval (e.g., N seconds) where the measurements may include a receiving channel signal variation/stabilization (e.g., received signal received power (RSRP) in LTE, a received signal code power (RSCP) in WCDMA, etc.), a number of OOS events, a number of RLFs, a number of intra- and inter-system selections/reselections, a number of inter-RAT ping pongs, signal variations above a specified delta, etc. The status engine 235 may identify patterns in these metrics to determine when the UE 110 is with a user performing an activity. For example, when the number of OOS events exceeds a predetermined threshold within the predetermined time interval, the status engine 235 may determine that an activity is being performed. The patterns may be different for different activities and the status engine 235 may be configured to dynamically determine the pattern for the different activity types (e.g., based on historical measurement information) and the different attenuation activities. Accordingly, each of the metrics may have corresponding thresholds for corresponding activity and attenuation activity types. In one exemplary embodiment, the status engine 235 may include a learning algorithm that learns the activity pattern of the individual user or group of users to identify difficult types of activities.

In using these metrics, the activity status may be determined to be that the user is performing the activity. For example, it may be that each of a combination of the metrics satisfies the respective threshold. The combination may include the number of RLFs, the number of OOS events, the number of cell (re)selections, the number of signal variations, and the number of inter-RAT ping pangs. When all of these metrics satisfy their respective thresholds, the status engine 235 may determine that the activity is not being performed. For example, the user may be in a non-activity state, the user may intend to start the activity but has not yet started performing the activity, the user has paused performing the activity, etc. However, if any one (or more) of the above metrics in the combination does not satisfy the respective threshold, the status engine 235 may determine that the user is performing the activity. It is noted that the use of a combination of metrics is only exemplary. According to further exemplary embodiments, the status engine 235 may be implemented with any different set of metrics in the combination, use any one individual metric, etc.

In a second example, the UE 110 may include a further component that provides information related to activities performed by the user of the UE 110. For example, the UE 110 may include a motion co-processor that detects specific activities. In a particular example, the motion co-processor may detect hand movements for different swim strokes while a user is swimming. The status engine 235 may receive the information from the motion co-processor and determine that the activity is being performed by the user. This scenario may be related to when the UE 110 is a wearable device and worn on the user's wrist/hand. In another example, the UE 110 may include a sensor configured to detect respective conditions related to an environment of the UE 110, the body of the user, a disposition of the UE 110, etc. The sensor may be a water monitor, a heart rate detector, a location application (e.g., GPS), etc. These sensors may have specific patterns in their output for different types of activities (e.g., sensing a sub-merging in water, detecting an increase/decrease in heart rate, an identification of a location or change in location over time such as a circular path while running or back and forth while swimming, etc.). The sensors may detect the activity status when the user engages in a given activity without explicitly initiating an activity application or providing an input on the activity application.

It is noted that the manual and automated approaches may result in conflicting determinations of whether an activity is being performed, especially when more than one of the above mechanisms is being used concurrently to determine the user performing an activity. For example, a first activity application may identify pool swimming while a second activity application may identify non-activity. The status engine 235 may be configured in a manual or automated way to prioritize the inputs from the various sources of the mechanisms to determine the activity status. Thus, when conflicting activities are determined, the status engine 235 may select and/or ignore certain inputs.

When the status engine 235 has positively identified an activity state, the exemplary embodiments include subsequent operations for scenarios that the UE 110 is located in a poor network coverage area. Specifically, the measurement engine 240 may measure a quality of a current connection of the UE 110 to a network. In one example, the current connection of the UE 110 may be to the LTE-RAN 122. The quality measurement of the connection to the LTE-RAN 122 may be a reference signal received power (RSRP), a reference signal received quality (RSRQ), a received signal strength indicator (RSSI), a power headroom (PHR), etc. If the quality measurement is at least a predetermined threshold, the selection engine 245 may use this output to perform a first set of operations as described in further detail below. If the quality measurement is below the predetermined threshold, the selection engine 245 may use this output to perform a second set of operations as described in further detail below. As those skilled in the art will understand, with regard to RSRP, a relatively good LTE RSRP may be in the range of −65 dBm to −110 dBm while a relatively weak LTE RSRP may be in the range of −110 dBm to −140 dBm where −140 dBm may represent a noise floor. Accordingly, the predetermined threshold with regard to RSRP as may be used in the exemplary embodiments may be −100 dBm. The measurement engine 240 may also be used to measure further connections that are established at subsequent times. As will be described in further detail below, the UE 110 may connect to the legacy RAN 120 or different cells of the LTE-RAN 122. The measurement engine 240 may determine a quality measurement for these further connections that are used to determine further operations that are to be performed.

Once a positive activity state is detected, the selection engine 245 may select a cell to which a connection is to be established based on the outputs of the status engine 235 and the measurement engine 240. In selecting the cell, the selection engine 245 may perform the first set of operations when the quality measurement is at least the predetermined threshold with respective priorities and paces in which to select a cell and may perform the second set of operations when the quality measurement is below the predetermined threshold with respective priorities and paces in which to select a cell.

In the first set of operations, when the quality measurement is at least the predetermined threshold, the UE 110 may be connected to the LTE-RAN 122 through a serving cell of the LTE-RAN 122. This serving cell of the LTE-RAN 122 may provide a relatively strong connection which does not fluctuate over a period of time greater than a predetermined duration of time. The selection engine 245 may maintain the serving cell of LTE-RAN 122 at a higher priority and a higher pace while other cells of the LTE-RAN 122 and RAT neighbors such as the legacy RAN 120 may be measured at a lower priority and a lower pace. The priority may indicate a preference that the selection engine 245 uses in selecting a cell to establish a network connection. The pace may indicate a rate at which the selection engine 245 measures a quality of a cell that serves as a basis to select the cell in establishing a network connection. In an exemplary implementation, the higher pace may be every cycle of a discontinuous reception (DRX) protocol while the lower pace may be every 3 to 4 cycles of the DRX protocol. By prioritizing and using a higher pace, the UE 110 may latch onto the current serving cell of the LTE-RAN 122 which provides a relatively strong connection. It is noted that when the UE 110 is connected to the legacy RAN 120 through a serving cell of the legacy RAN 120 and this connection is determined to be relatively strong, the selection engine 245 may prioritize and use a higher pace for this serving cell so that the UE 110 latches onto the serving cell of the legacy RAN 120.

Under the first set of operations when the current connection through the serving cell of the LTE-RAN 122 is initially relatively strong, the selection engine 245 may include subsequent operations when the serving cell of the LTE-RAN 122 degrades. When the serving cell of the LTE-RAN 122 which initially provided a strong connection degrades and now provides a poor connection, the selection engine 245 may perform a low priority cell reselection and move to a different serving cell of the LTE-RAN 122 or to the legacy RAN 120. If attempts to establish a connection to the different serving cell of the LTE-RAN 122 or to the legacy RAN 120 fails to establish a network connection, the selection engine 245 may generate a failure output indicating that the connection failed to establish. The OOS scan engine 250 may utilize this failure output to perform the functionality as described below.

In an exemplary prioritization, a first LTE serving cell may be used by the UE 110 to establish a connection to the LTE-RAN 122. The first LTE serving cell may provide a strong connection. Accordingly, the first LTE serving cell may be set with a higher priority and a higher pace. Further cells that may be available to the UE 110 at its current position may include a second and a third LTE serving cell as well as a WCDMA network. The selection engine 245 may have prioritized these available cells in an order indicating the second LTE serving cell, the WCDMA network, and the third LTE serving cell. So long as the first LTE serving cell remains to provide a strong connection, the UE 110 may continue to use the first LTE serving cell. At a subsequent time, a quality measurement from the measurement engine 240 may indicate that the first LTE serving cell is no longer providing a sufficient quality for the connection. The selection engine 245 may then select the second LTE serving cell to attempt to establish a connection to the LTE-RAN 122. If successful, the selection engine 245 may utilize the second LTE serving cell to connect to the LTE-RAN 122 so long as the quality of the connection remains above the predetermined threshold. If unsuccessful, the selection engine 245 may utilize the WCDMA network to establish a connection so long as the quality of the connection remains above the predetermined threshold. The selection engine 245 may cycle through each of the available cells in attempting to establish a connection that satisfies the predetermined threshold. The selection engine 245 may also go through iterations of the priority list for a predetermined number of cycles prior to entering a panic mode. Thus, when there are continuous failures from each attempt (or from each cycle of attempts), the selection engine 245 may generate the failure output.

In the second set of operations when the quality measurement is below the predetermined threshold, the UE 110 may be connected to the LTE-RAN 122 through a serving cell of the LTE-RAN 122. This serving cell of the LTE-RAN 122 may provide a relatively poor connection having a quality measurement that is below the predetermined threshold. Since the serving cell of the LTE-RAN 122 provides a relatively poor connection, the selection engine 245 may identify the available cells of the LTE-RAN 122 (including the currently connected serving cell) and set a lower priority and a lower pace (e.g., at the values indicated above). In this scenario and according to the exemplary embodiments, the legacy RAN 120 may be set at a higher priority and a higher pace (e.g., at the values indicated above) so that a high priority reselection to the legacy RAN 120 (e.g., the WCDMA network) may be utilized.

With the legacy RAN 120 being prioritized at a higher pace, the UE 110 may move to the legacy RAN 120 and the entire LTE-RAN 122 including all available LTE cells may be measured at a lower pace such that the baseband of the UE 110 latches onto the current CDMA serving cell/RAT. Under the second set of operations when the current connection through the serving cell of the LTE-RAN 122 is relatively poor, the selection engine 245 may include subsequent operations when the serving cell of the legacy RAN 120 to which the UE 110 has roamed degrades. When the serving cell of the legacy RAN 120 is determined to provide a poor connection or which initially provided a strong connection degrades and now provides a poor connection, the selection engine 245 may perform a low priority cell reselection and move to a different serving cell of the LTE-RAN 122. If attempts to establish a connection to the different serving cell of the LTE-RAN 122 fail to establish a network connection, the selection engine 245 may generate a failure output indicating that the connection failed to establish. The OOS scan engine 250 may utilize this failure output to perform the functionality as described below.

By using the above mechanism according to the exemplary embodiments, a quality measurement of a currently connected cell of the LTE-RAN 122 may be evaluated to determine a prioritization of available cells with corresponding paces that is to be used. Since an activity may expose the UE 110 to an environment that may provide a poor network coverage for the LTE-RAN 122, the exemplary embodiments enable the legacy RAN 120 to be prioritized in these scenarios while the LTE-RAN 122 may remain being prioritized when strong network coverage (above the predetermined threshold) is measured. Accordingly, the UE 110 may be prepared to establish or maintain a connection to a network with a higher probability that a sufficient connection (above the predetermined threshold) is established. By increasing the odds that a sufficient connection is established, the number of operations that may be performed to establish such a connection may be decreased. Thus, the exemplary embodiments may provide a more efficient set of operations that may be dynamically used based on current conditions of the UE 110 and provide a better use of power.

As noted above, there may be scenarios where a panic mode is entered. The panic mode may be a result of attempts to establish a network connection using the above mechanism whether or not an initial quality measurement of a currently connected serving cell of the LTE-RAN 122 is strong or poor. That is, the panic mode may relate to when an OOS event has occurred and the baseband uses a set of operations to address an OOS state. When the OOS state is reached, the UE 110 may utilize the OOS scan engine 250. As noted above, the OOS scan engine 250 may perform operations when a panic mode is entered upon an OOS event occurring from using the functionality of the selection engine 245.

The OOS scan engine 250 may be configured to perform OOS scan procedures including one or more OOS scans to detect available cells in the LTE-RAN 122 or the legacy RAN 120. Those skilled in the art will understand the operations and measurements that may be performed/taken when the UE 110 enters the OOS state in an attempt to identify cells and establish a connection from the OOS state. Upon entering the OOS state, the OOS scan engine 250 may perform an initial OOS scan procedure. When at least one cell is detected, the UE 110 may attempt to establish a connection to the network to which the corresponding cell belongs. If successful, the UE 110 may return to the mechanism used by the selection engine 245. If unsuccessful, the UE 110 may perform further attempts with each detected cell. However, if no cells are detected, the OOS scan engine 250 may perform a second OOS scan procedure.

Prior to performing a subsequent OOS scan procedure, the OOS scan engine 250 may adaptively lower a pace at which the OOS scans in an OOS scan procedure are performed. The pace in performing the OOS scans may relate to a time window between successive OOS scans. By lowering the pace, the time window may be increased. The OOS scan engine 250 may adaptively adjust the pace based on a mobility of the UE 110. Again, since the user holding the UE 110 may be performing an activity that utilizes the mobility feature of the UE 110, the UE 110 may be moving relative to a predetermined movement threshold. When the UE 110 is moving below the predetermined movement threshold, the OOS scan engine 250 may maintain the pace and keep a time window constant between successive OOS scans. For example, an initial pace for an OOS scan procedure may be 10 OOS scans within 5 seconds. Thus, with high mobility, the same pace may be used where 10 OOS scans are performed within 5 seconds. However, when the UE 110 is moving below the predetermined movement threshold, the OOS scan engine 250 may lower the pace and increase a time window between successive OOS scans. For example, a prior pace may be 10 OOS scans within 5 seconds. Thus, with low mobility, a lower pace may be used where 10 OOS scans are performed within 10 seconds. According to an exemplary implementation, upon detecting low mobility, the time window in which to perform 10 OOS scans may be doubled. Thus, when a prior pace includes 10 OOS scans within 10 seconds, an ensuing pace during low mobility may include 10 OOS scans within 20 seconds.

Using the adaptive pace for successive OOS scan procedures, the OOS scan engine 250 may continue performing OOS scan procedures. The OOS scan engine 250 may perform a successive OOS scan procedure after waiting a predetermined time period. The OOS scan engine 250 may be configured with a predetermined number of OOS scan procedures that are to be performed. For example, the OOS scan engine 250 may be configured to perform 3 OOS scan procedures. Again, subsequent OOS scan procedures may be used when cells are not detected in prior OOS scan procedures or attempts to establish a connection from detected cells from prior OOS scan procedures are unsuccessful. When the baseband fails to find service after the predetermined number of OOS scan procedures, the OOS scan engine 250 may perform subsequent operations based on the current conditions. According to the exemplary embodiments, the current conditions may include whether a short-range communication pathway is available to the UE 112. Thus, the OOS scan engine 250 may determine a use of the companion relationship.

When the UE 110 is not part of or is not using the companion relationship, the OOS scan engine 250 may be configured to utilize a timer. Upon expiry of the timer, the counter used to track the OOS scan procedures that were performed may be reset and the OOS scan engine 250 may again perform the OOS scan procedures.

When the UE 110 is using the companion relationship, the OOS scan engine 250 may utilize information from the UE 112. As noted above, the UE 110 may utilize both the baseband to establish a network connection and the short-range communication pathway of the companion relationship with the UE 112. When the companion relationship is being used and the short-range communication pathway is established, the OOS scan engine 250 may place the UE 110 to remain in the OOS state and terminate further OOS scan procedures. If the companion relationship or the short-range communication pathway is terminated, the OOS scan engine 250 may proceed as noted above when the companion relationship is not used. However, during a time that the companion relationship is used and the short-range communication pathway is established, the OOS scan engine 250 may detect when an indication is received from the UE 112. The indication from the UE 112 may identify a cell on which the UE 112 has camped. Using this information, the UE 110 may attempt to establish a network connection to the same cell. If successful, the UE 110 may return to the mechanism used by the selection engine 245. If unsuccessful, the UE 110 may continue to monitor the companion relationship and the short-range communication pathway.

Based on whether an activity state is detected, the UE 110 may also be configured to determine data transfer sessions that are to be allowed or barred. As noted above, the data transfer engine 255 may selectively enable or disable a data transfer session based on current conditions of the UE 110 and a type of data transfer session. Specifically, when an activity is not detected, a full enabling of data transfer sessions may be used. However, when an activity is detected, a selective enabling of data transfer sessions may be used. According to an exemplary implementation, the applications processor may indicate to the baseband a type of data transfer session that is being requested. For example, the type may be whether the data transfer session is a background (e.g., automated) or a foreground (e.g., user initiated) data transfer. When the data transfer session is for a foreground data transfer (e.g., user initiated transfer, emergency call, connection establishment, etc.), the data transfer engine 255 may honor the request for these data transfer sessions. However, when the data transfer session is for a background data transfer (e.g., application originating request), the data transfer engine 255 may terminate the session by providing a reason to the applications processor that access is barred. Thus, the applications processor side and background applications may abort or buffer/pend the low priority data transfer session. When buffered/pended, the applications processor may re-attempt the data transfer session at a time when the activity has concluded.

Figure 3:
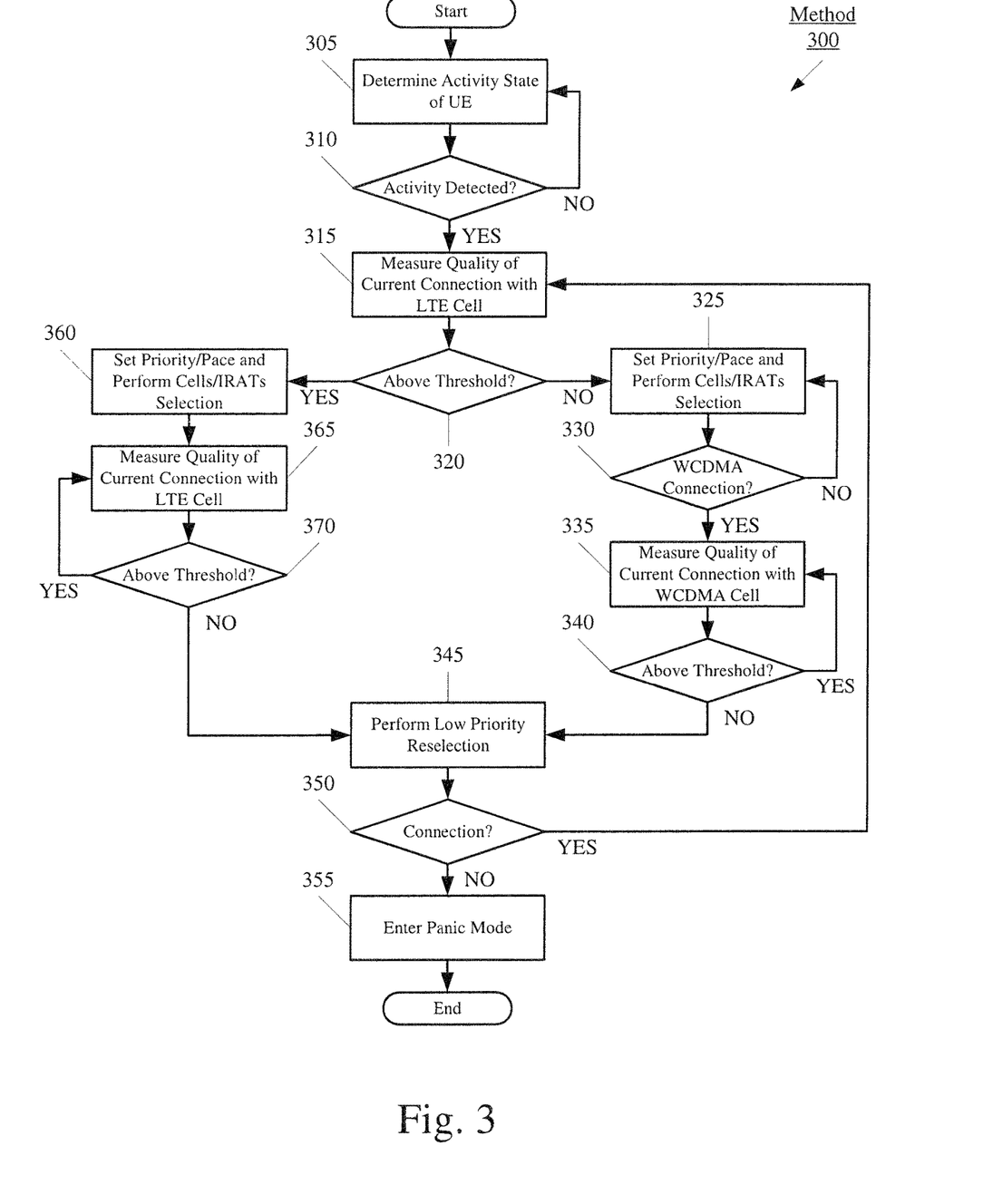
FIG. 3 shows an exemplary method for establishing a network connection during an activity according to various exemplary embodiments described herein.

FIG. 3 shows an exemplary method 300 for establishing a network connection during an activity according to various exemplary embodiments described herein. The activity may position the UE 110 in an environment where a network coverage may be relatively poor resulting in increased power usage from performing operations if a connection establishment approach is maintained. Thus, the method 300 is configured to utilize a dynamic priority to establish a network connection in view of the poor network coverage. The method 300 may be performed by the status engine 235, the measurement engine 240, the selection engine 245, and/or other components of the UE 110. The method 300 will be described with regard to the network arrangement 100 of FIG. 1 and the UE 110 of FIG. 2.

In 305, the UE 110 determines an activity state of the UE 110. Specifically, the UE 110 determines whether a user in possession of the UE 110 is performing an activity that places the UE 110 in an environment where a network coverage may range from strong to poor to OOS. As described above, the UE 110 may determine, via the status engine 235, a type of activity that is being performed by a user. The status engine 235 may use an input received by an activity application, automated determinations based on various measurements, or a combination thereof. In 310, if an activity is not detected, the UE 110 returns to 305 to continue monitoring a status of the UE 110. However, if an activity is detected, the UE 110 continues to 315.

In 315, the UE 110 measures a quality of the current connection with the LTE serving cell via the measurement engine 240. As noted above, the exemplary embodiments may assume that the UE 110 is connected to the LTE-RAN 122 when the activity is detected. Thus, the UE 110 may connect to the LTE-RAN 122 via a LTE serving cell. However, it is also possible that the UE 110 is currently connected to the legacy RAN 120 or the WLAN 124 and the method 300 is applicable to when these are the current conditions. The quality of the current connection may be based on one or more network parameters that are measured (e.g., RSRP, RSRQ, RSSI, etc.). Thus, in 320, the UE 110 determines whether the quality is at least a predetermined threshold corresponding to the type of quality measurement. If the quality is at least the predetermined threshold, the UE 110 continues to 360. If the quality is below the predetermined threshold, the UE 110 continues to 325.

In 325, the UE 110 sets a priority and pace for the available cells of the LTE-RAN 122 and the legacy RAN 120 and performs the scans/connection procedures as needed. Since the current connection to the LTE-RAN 122 via the serving LTE cell is determined to be relatively poor, the UE 110 via, the selection engine 245, may set a lower priority for the cells of the LTE-RAN 122 as well as set a lower pace in which to measure the cells of the LTE-RAN 122. The UE 110 may set a higher priority for the legacy RAN 120 as well as set a higher pace in which to measure the cells of the legacy RAN 120.

With the higher priority and the higher pace, there is a higher likelihood that a connection is established to the legacy RAN 120. Thus, in 330, the UE 110 determines if a connection to the legacy RAN 120 is established. If a connection is not established, the UE 110 returns to 325 where the priority and pace are set and connection procedures are used to establish a network connection. It is noted that when the connection to a first cell of the legacy RAN 120 is not established, the UE 110 may also attempt to establish a network connection to other cells of the legacy RAN 120 based on the priority/pace. Thus, when another connection is established, the UE 110 may continue the method 300 based on the new connection.

If the connection to the legacy RAN 120 is established (e.g., to the WCDMA network), the UE 110 continues to 335. In 335, the UE 110 measures a quality of the current connection with the serving cell of the legacy RAN 120 in a substantially similar manner as performed in 315. In 340, the UE 110 determines if the quality of the connection is at least the predetermined threshold. If the quality of the connection is at least the predetermined threshold, the UE 110 returns to 335 to continue monitoring the quality of the connection. However, if the quality of the connection is or becomes below the predetermined threshold, the UE 110 continues to 345.

In 345, the UE 110 performs a low priority reselection. As noted above in 325, the cells of the LTE-RAN 122 may be measured and selected to attempt to establish a connection to the LTE-RAN 122. In 350, the UE 110 determines if the attempt to establish a connection is successful. If a connection was established, the UE 110 returns to 315 where the UE 110 may continue to monitor the activity and use of the current serving LTE cell. However, if a connection is not established, the UE 110 continues to 355 where the UE 110 enters a panic mode.

Returning to 320, as noted above, if the quality of the connection is at least the predetermined threshold, the UE 110 continues to 360. In 360, the UE 110 sets a priority and pace for the available cells of the LTE-RAN 122 and the legacy RAN 120. Since the current connection to the LTE-RAN 122 via the serving LTE cell is determined to be strong, the UE 110 via the selection engine 245 may set a higher priority for the current serving LTE cell of the LTE-RAN 122 as well as set a higher pace for this cell. The UE 110 may set a lower priority for the other cells of the LTE-RAN 122 and the legacy RAN 120 as well as set a lower pace in which to measure the cells of the other cells of the LTE-RAN 122 and the legacy RAN 120.

In 365, the UE 110 measures a quality of the current connection with the serving cell of the LTE-RAN 122 in a substantially similar manner as performed in 315. In 370, the UE 110 determines if the quality of the connection is at least the predetermined threshold. If the quality of the connection is at least the predetermined threshold, the UE 110 returns to 365 to continue monitoring the quality of the connection. However, if the quality of the connection is or becomes below the predetermined threshold, the UE 110 continues to 345 and proceeds in a substantially similar manner as described above.

Figure 4:
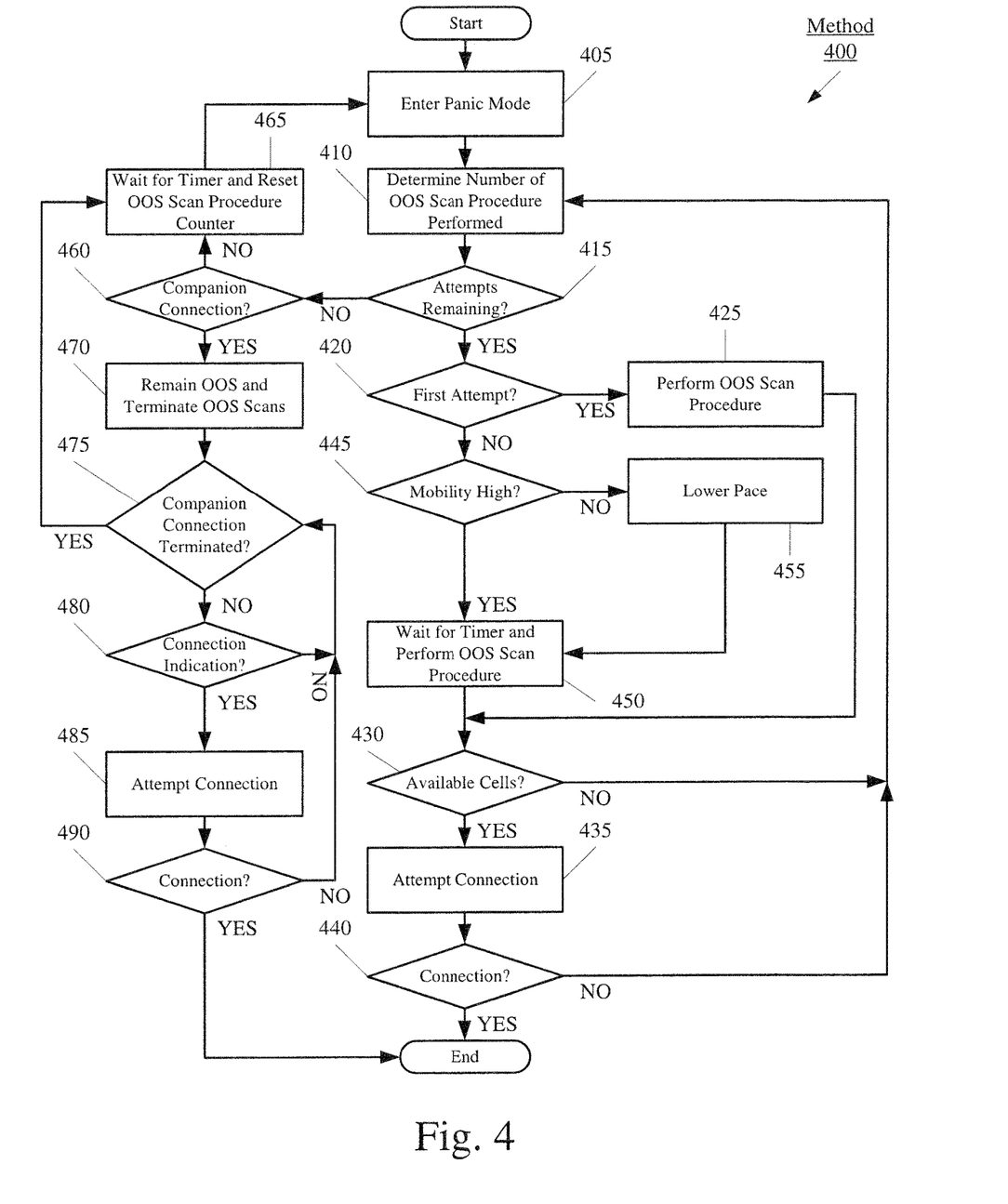
FIG. 4 shows an exemplary method for performing operations upon entering a panic mode according to various exemplary embodiments described herein.

FIG. 4 shows an exemplary method 400 for performing operations upon entering a panic mode according to various exemplary embodiments described herein. Even with the approach of the method 300 of FIG. 3, the UE 110 may still enter a panic mode when the UE 110 enters an OOS state. Thus, the method 400 is configured to perform OOS scan procedures in a dynamic manner based on current conditions to establish a network connection. The method 400 may be performed by the OOS scan engine 250 and/or other components of the UE 110. The method 400 will be described with regard to the network arrangement 100 of FIG. 1 and the UE 110 of FIG. 2.

In 405, the UE 110 enters the panic mode. As noted above in the method 300 of FIG. 3, if a connection is not established after selecting cells based on the priority and pace, an OOS event may result. The UE 110 may thus be in an OOS state and enter the panic mode. In the panic mode and while the UE 110 is in the OOS state, subsequent operations may be performed to detect cells and attempt to establish a connection.

In 410, the UE 110 determines a number of OOS scan procedures that have been performed. As this moment in the pass of the method 400 is a first iteration, the number of the OOS scan procedures performed may be zero. However, the UE 110 may be limited to the number of OOS scan procedures as a predetermined number that may be performed over a period of time. Thus, in 415, the UE 110 determines whether there are attempts of OOS scan procedures remaining. If the OOS scan procedures have been performed at least the predetermined number, the UE 110 continues to 460 which will be described in further detail below. However, if the OOS scan procedures have been performed less than the predetermined number, the UE 110 continues to 420.

In 420, the UE 110 determines whether the OOS scan procedure that is to be performed is a first one. If the OOS scan procedure that is to be performed is not a first attempt in this set of OOS scan procedures, the UE 110 continues to 445 which will be described below. However, if the OOS scan procedure is a first one, the UE 110 continues to 425. In 425, the UE 110 performs the OOS scan procedure using an initial pace. The first OOS scan procedure may include one or more OOS scans that are performed over a period of time. For example, the initial pace for the first OOS scan procedure may include 10 OOS scans within 5 seconds. The OOS scans may be performed at regular or irregular intervals.

In 430, the UE 110 determines if there are any available cells that are detected from the OOS scan procedure. If no cells are detected, the UE 110 returns to 410 to proceed accordingly. However, if at least one cell of the LTE-RAN 122 or the legacy RAN 120 is detected, the UE 110 continues to 435. In 435, the UE 110 attempts to establish a connection using the cells that are detected. The UE 110 may prioritize the detected cells when more than one cell is detected. The prioritization may be based on the initial quality measurement of the serving LTE cell as was used in the method 300. In 440, the UE 110 determines if a connection is established. If a connection is established, the method 400 ends and the UE 110 may return to using the method 300. However, if a connection is not established, the method 400 returns to 410 to proceed accordingly.

Returning to 420, if the current iteration of the OOS scan procedure is a successive one, the UE 110 continues to 445. For example, after 430 or 440, the UE 110 may have returned to 410 for a successive OOS scan procedure to be performed. Thus, in 445, the UE 110 adaptively sets a pace for the OOS scan procedure based on whether the UE 110 is experiencing a high mobility. If the UE 110 is experiencing a high mobility, the UE 110 continues to 450 where a timer between successive OOS scan procedures is used and the OOS scan procedure is performed using the prior pace that was set. Thereafter, the UE 110 continues to 430. If the UE 110 is experiencing a low mobility, the UE 110 continues to 455 where a pace is lowered and a time window in which to perform the OOS scan procedure is increased. For example, a same number of OOS scans may be performed over a duration of time that is double of a previous OOS scan procedure. Thus, to continue the example above, 10 scans may be performed over a period of 10 seconds for a second iteration or 20 seconds for a third iteration. The UE 110 then continues to 450 where the timer is used and the OOS scan procedure is performed using the lowered pace. Thereafter, the UE 110 continues to 430.

Returning to 415, when the OOS scan procedures have been performed and the predetermined number has been reached, the UE 110 continues to 460. In 460, the UE 110 determines whether there is a companion relationship and whether a short-range communication pathway is established based on this companion relationship. If there is no companion relationship or there is no short-range communication pathway, the UE 110 continues to 465 where a timer is used to perform another cycle of OOS scan procedures. Thus, an OOS scan procedure counter is reset and the UE 110 returns to 405.

If there is a companion relationship and there is a short-range communication pathway that is established, the UE continues from 460 to 465. In 470, the UE 110 remains OOS and terminates OOS scans and OOS scan procedures. In 475, the UE 110 determines whether the short-range communication pathway has been terminated. Those skilled in the art will understand that there may be various reasons that the short-range communication pathway may be terminated (e.g., the UE 110 move far enough away from the UE 112). If the short-range communication pathway has been terminated, the UE 110 returns to 465 and proceeds as described above. However, if the short-range communication pathway persists and while this short-range communication pathway is established, the UE 110 continues to 480.

In 480, the UE 110 determines whether a connection indication has been received from the UE 112 over the short-range communication pathway. The connection indication may identify a cell to a corresponding network that the UE 112 has successfully established a connection. If no connection indication is received, the UE 110 returns to 475 where the short-range communication pathway is evaluated. If a connection indication is received, the UE 110 continues to 485. In 485, the UE 110 attempts to establish a connection using the cell identified in the connection indication. In 490, the UE 110 determines whether a connection has been established. If a connection is established, the method 400 ends and the UE 110 may return to using the method 300. However, if a connection is not established, the method 400 returns to 475 to proceed accordingly.

Figure 5:
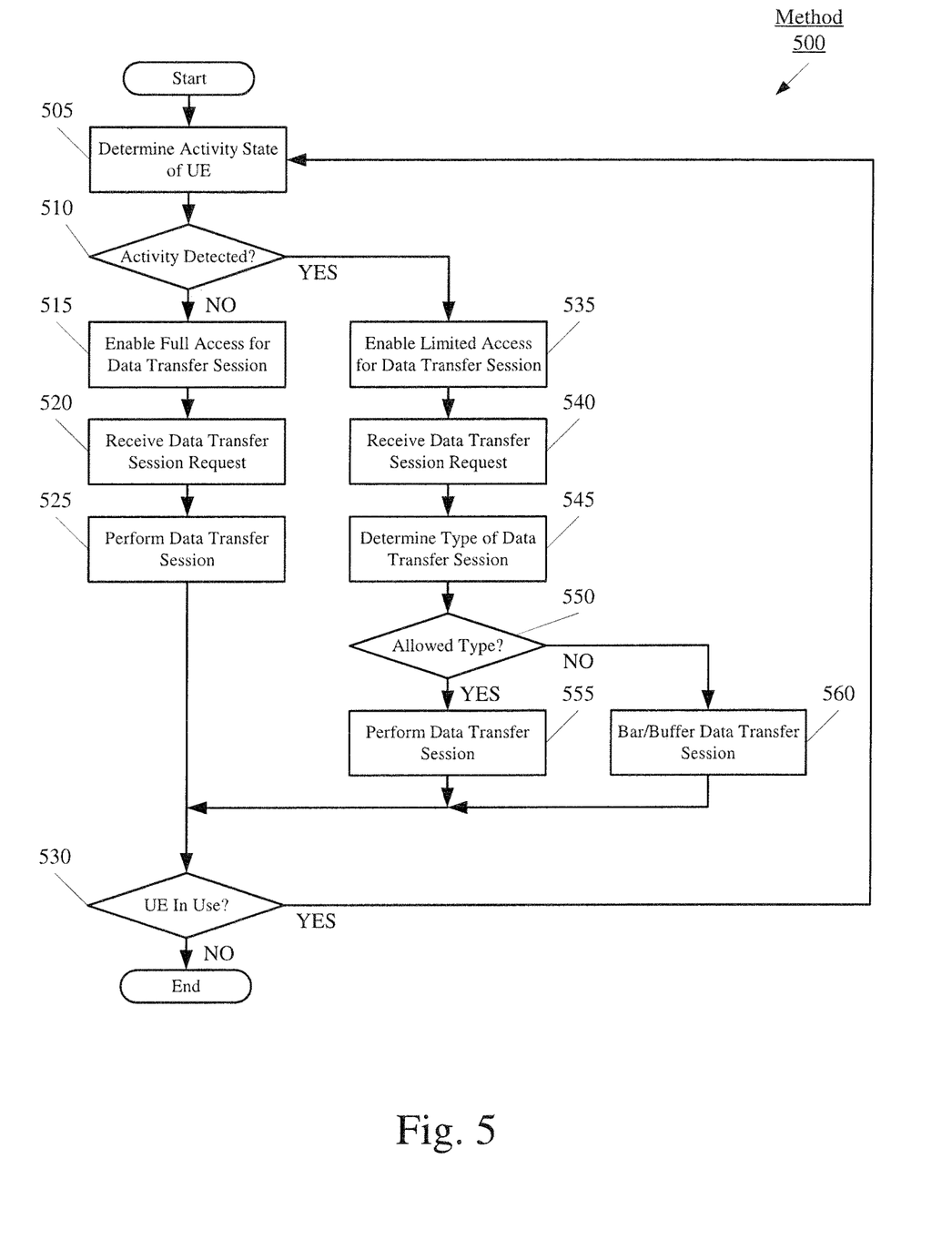
FIG. 5 shows an exemplary method for controlling data transfer sessions during an activity according to various exemplary embodiments described herein.

FIG. 5 shows an exemplary method 500 for controlling data transfer sessions during an activity according to various exemplary embodiments described herein. The activity may position the UE 110 in an environment where a network coverage may be relatively poor resulting in increased power usage from performing operations if a connection establishment approach is maintained. Thus, the method 500 is configured to selectively enable or disable data transfer sessions during the activity and fully enable data transfer sessions outside the activity. The method 500 may be performed by the status engine 235, the data transfer engine 255, and/or other components of the UE 110. The method 500 will be described with regard to the network arrangement 100 of FIG. 1 and the UE 110 of FIG. 2.

In 505, the UE 110 determines an activity state of the UE 110 in a substantially similar manner as 305 of the method 300. In 510, if an activity is not detected, the UE 110 continues to 515 where operations corresponding to a non-activity state are performed. However, if an activity is detected, the UE 110 continues to 535 where operations corresponding to the activity state are performed.

With a non-activity state being detected, in 515, the UE 110 enables a full access for data transfer sessions regardless of the type. For example, foreground and background data transfer sessions may be allowed. Thus, in 520, when the UE 110 receives a data transfer session request, in 525, the UE 110 performs the data transfer session. In 530, the UE 110 determines whether the UE is still in use. If still in use, the UE 110 returns to 505 to continue monitoring the activity status of the UE 110. It should be noted that the full access refers to a condition based on the activity state. The data transfer sessions of the UE 110 may be throttled or discontinued for other reasons unrelated to the activity state.

Returning to 510, with activity being detected, in 535, the UE 110 enables a limited access for data transfer sessions based on the type. For example, foreground data transfer sessions (e.g., user initiated, emergency call, connection establishment, etc.) may be types that are allowed while background data transfer sessions (e.g., application initiated) may be types that are barred. Thus, in 540, when the UE 110 receives a data transfer session request (e.g., from the applications processor to the baseband), in 545, the UE 110 determines a type associated with the request. In 550, if the type is identified to be an allowed type, the UE 110 continues to 555 where the data transfer session is performed. However, in 550, if the type is identified to be a barred type, the UE 110 continues to 560 where the data transfer session is barred such that the applications processor or the background application may buffer or pend the low priority data transfer session for a subsequent time (e.g., after the activity status is changed to non-activity). It should be noted that there may be other manners of limiting access for data transfer sessions unrelated to type. For example, the data access may be limited based on the application that is requesting the access, the data access may be limited based on a size of the data to be transferred, the data access may be limited based on a remaining battery power, etc. These settings may be preferences that may be set automatically or by a user.

The exemplary embodiments provide a device, system, and method of reducing power usage of a UE during a time that a user in possession of the UE is performing an activity. Upon detecting the activity, the exemplary embodiments are configured to prioritize and select a pace for available cells on a LTE-RAN and a legacy RAN. The exemplary embodiments are also configured to selectively enable or disable data transfer sessions while the activity is being performed. The exemplary embodiments also provide a mechanism when a connection is not established and an OOS event is experienced.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A method, comprising:
   at a device that is configured to establish a network connection to a first network via one of a plurality of first cells and to a second network via one of a plurality of second cells, the device connected to the first network via a first cell of the plurality of first cells:
   detecting device data corresponding to activity of a user of the device;
   determining an activity state or a non-activity state associated with the device based at least on the device data;
   measuring a quality of the network connection via the first cell;
   when the activity state is determined and when the quality is at least a predetermined threshold, setting a first priority and a first scanning pace for the first cell and a second priority and a second scanning pace for other ones of the first cells and the second cells, the first and second priorities indicating a preference for selection, the first and second scanning paces indicating a frequency with which a measurement is performed for the corresponding cells;
   measuring a first subsequent quality of the network connection via the first cell at a subsequent time; and
   when the subsequent quality is below the predetermined threshold, performing a low priority reselection using the other ones of the first cells and the second cells.

2. The method of claim 1, further comprising:
   when the activity state is determined and when the quality is below the predetermined threshold, setting a third priority and a third scanning pace for the first cells and a fourth priority and a fourth scanning pace for the second cells.

3. The method of claim 2, further comprising:
   establishing a connection to one of the first network or the second network based on the first, second, third, and fourth priorities and the first, second, third, and fourth scanning paces.

4. The method of claim 1, wherein the first network is an Evolved Universal Mobile Telecommunications System (UMTS) Terrestrial Radio Access Network (EUTRAN) and the second network is an example of a UMTS Terrestrial Radio Access Network (UTRAN).

5. The method of claim 1, wherein, when the quality is at least the predetermined threshold, the first priority is a higher priority than the second priority, and the first scanning pace has a higher frequency than the second pace.

6. The method of claim 1, further comprising:
   establishing a further network connection to the second network via a second cell of the plurality of second cells;
   measuring a second subsequent quality of the further network connection via the second cell at the subsequent time; and
   when the second subsequent quality is below the predetermined threshold, performing the low priority reselection using the first cells.

7. The method of claim 6, wherein the low priority reselection places the device in an out of service (OOS) state.

8. The method of claim 7, further comprising:
   performing an OOS scan procedure, the OOS scan procedure being performed at an OOS scan pace.

9. The method of claim 8, further comprising:
   when the OOS scan procedure does not detect one of the first cells or the second cells or maintains the OOS state, performing a further OOS scan procedure.

10. The method of claim 9, further comprising:
    adaptively setting the OOS scan pace based on a mobility of the device,
    wherein, when the mobility is at least a movement threshold, the OOS scan pace is maintained,
    wherein, when the mobility is below the movement threshold, the OOS scan pace is lowered.

11. The method of claim 7, wherein, after performing the OOS scan procedure, the method further comprises:
    detecting a short-range communication pathway with a further device;
    terminating the OOS scan procedure;
    receiving a connection indication from the further device, the connection indication identifying one of the first or second cells to which the further device has established a connection; and
    attempting to establish a connection to one of the first network or the second network based on the connection indication.

12. The method of claim 1, wherein, when the activity state is determined, the method further comprises:
    selectively enabling an access for a data transfer session to be performed based on a type of the data transfer session,
    wherein the type is a first type or a second type.

13. The method of claim 12, wherein the first type is a background data transfer session and the second type is a foreground data transfer session.

14. A device, comprising:
    a transceiver configured to establish a network connection to a first network via one of a plurality of first cells and to a second network via one of a plurality of second cells, the device connected to the first network via a first cell of the plurality of first cells; and
    a processor detecting device data corresponding to activity of a user of the device, determining an activity state or a non-activity state associated with the device based on at least the device data, the processor measuring a quality of the network connection via the first cell, when the activity state is determined and when the quality is at least a predetermined threshold, the processor setting a first priority and a first scanning pace for the first cell and a second priority and a second scanning pace for other ones of the first cells and the second cells, the first and second priorities indicating a preference for selection, the first and second scanning paces indicating a frequency with which a measurement is performed for the corresponding cells, wherein, when the activity state is determined and when the quality is below the predetermined threshold, the processor sets a third priority and a third scanning pace for the first cells and a fourth priority and a fourth scanning pace for the second cells.

15. The device of claim 14, wherein a connection is established to one of the first network or the second network based on the first, second, third, and fourth priorities and the first, second, third, and fourth scanning paces.

16. The device of claim 14, further comprising:
sensors configured to generate data indicative of conditions of the device used to determine the activity.

17. A method, comprising:
at a device that is configured to establish a network connection to a first network via one of a plurality of first cells and to a second network via one of a plurality of second cells, the device connected to the first network via a first cell of the plurality of first cells:
detecting device data corresponding to activity of a user of the device;
determining an activity state or a non-activity state associated with the device based at least on the device data;
measuring a quality of the network connection via the first cell;
when the activity state is determined and when the quality is below the predetermined threshold, setting a first priority and a first scanning pace for the first cells and a second priority and a second scanning pace for the second cells, the first and second priorities indicating a preference for selection, the first and second scanning paces indicating a frequency with which a measurement is performed for the corresponding cells; and
when the activity state is determined and when the quality is at least a predetermined threshold, setting a third priority and a third scanning pace for the first cell and a fourth priority and a fourth scanning pace for other ones of the first cells and the second cells.

* * * * *